United States Patent
Yeung et al.

(10) Patent No.: US 9,552,322 B2
(45) Date of Patent: Jan. 24, 2017

(54) HYBRID REPEATER FOR SUPPORTING BACKWARD COMPATIBILITY

(71) Applicant: Pericom Semiconductor Corporation, Milpitas, CA (US)

(72) Inventors: Tony Yeung, Milpitas, CA (US); Michael Y. Zhang, Palo Alto, CA (US)

(73) Assignee: Pericom Semiconductor Corporation, Milpitas, CA (US)

( * ) Notice: Subject to any disclaimer, the term of this patent is extended or adjusted under 35 U.S.C. 154(b) by 322 days.

(21) Appl. No.: 14/302,722

(22) Filed: Jun. 12, 2014

(65) Prior Publication Data

US 2015/0363350 A1    Dec. 17, 2015

(51) Int. Cl.
*G06F 13/42*    (2006.01)
*G06F 13/40*    (2006.01)

(52) U.S. Cl.
CPC ....... *G06F 13/4221* (2013.01); *G06F 13/4045* (2013.01); *G06F 2213/0026* (2013.01); *G06F 2213/0032* (2013.01)

(58) Field of Classification Search
CPC ............. G06F 13/4221; G06F 2213/0026; G06F 2213/0032; G06F 13/385; G06F 13/387; H04L 29/06; H04L 69/18
See application file for complete search history.

(56) References Cited

U.S. PATENT DOCUMENTS

| | | | | |
|---|---|---|---|---|
| 5,666,359 A | * | 9/1997 | Bennett | H04L 12/44 370/358 |
| 2001/0038106 A1 | * | 11/2001 | Coteus | G11C 7/1051 257/200 |
| 2011/0293035 A1 | * | 12/2011 | Kobayashi | H04L 5/16 375/295 |
| 2012/0309290 A1 | * | 12/2012 | Simmons | H04W 52/0251 455/7 |
| 2014/0003306 A1 | * | 1/2014 | Chen | G06F 13/4027 370/293 |

FOREIGN PATENT DOCUMENTS

CN    201520402012.7    12/2015

OTHER PUBLICATIONS

Chinese Notice of Grant dated Oct. 26, 2015 issued in Application No. CN 201520402012.7.

* cited by examiner

*Primary Examiner* — Farley Abad
(74) *Attorney, Agent, or Firm* — Weaver Austin Villeneuve & Sampson LLP

(57) ABSTRACT

Hybrid repeaters are described that are capable of transmitting data in accordance with different versions of a serial data protocol are described. The appropriate circuitry to be used to transmit incoming serial data is determined by monitoring sideband communication (e.g., a link training handshake) between the transmitter and the receiver.

20 Claims, 3 Drawing Sheets

HYBRID REPEATER FOR SUPPORTING BACKWARD COMPATIBILITY

BACKGROUND

Transmission protocols used to transmit serial data between connected devices are constantly in the process of being revised with new and improved versions being deployed every few years. Examples of such protocols include the DisplayPort standard, the High-Definition Multimedia Interface (HDMI) standard, the Serial ATA standard, the Peripheral Component Interconnect Express (PCI-E) standard, and the Universal Serial Bus (USB) standard. While the continued evolution of these and other protocols is generally desirable, it is important to provide support for legacy devices during the remainder of their useful lives.

SUMMARY

A repeater circuit includes first circuitry configured to operate in accordance with a first version of a serial data protocol. The first version of the serial data protocol is characterized by a first data rate. The repeater also includes second circuitry configured to operate in accordance with a second version of the serial data protocol. The second version of the serial data protocol is characterized by a second data rate that is higher than the first data rate. Detection circuitry is configured to determine, with reference to sideband communication between a transmitting device and a receiving device, whether incoming data from the transmitting device should be transmitted to the receiving device according to the first version of the serial data protocol or the second version of the serial data protocol. Selection circuitry is configured to select, responsive to the detection circuitry, the first circuitry or the second circuitry for transmission of the incoming data from the transmitting device to the receiving device.

According to various implementations, the serial data protocol corresponds to one of the DisplayPort standard, the High-Definition Multimedia Interface (HDMI) standard, the Serial ATA standard, the Peripheral Component Interconnect Express (PCI-E) standard, or the Universal Serial Bus (USB) standard.

According to a specific implementation, the second circuitry includes data and clock recovery circuitry configured to align data pulses of the incoming data with data strobes. According to a more specific implementation, the repeater includes a state machine configured to control one or more aspects of the operation of the repeater in response to command content of the data pulses.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. These examples are provided for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Repeaters for transmitting data in accordance with serial data protocols are described. Repeaters enabled by the present disclosure include circuitry for transmitting serial data according to different versions of the same protocol. The appropriate circuitry to be used to transmit incoming data is determined by monitoring sideband communication (e.g., a link training sequence) between the transmitting and receiving devices. This promotes backward compatibility with legacy devices as newer devices migrate to later versions of the protocol. Some examples will be illustrative.

Figure 1:
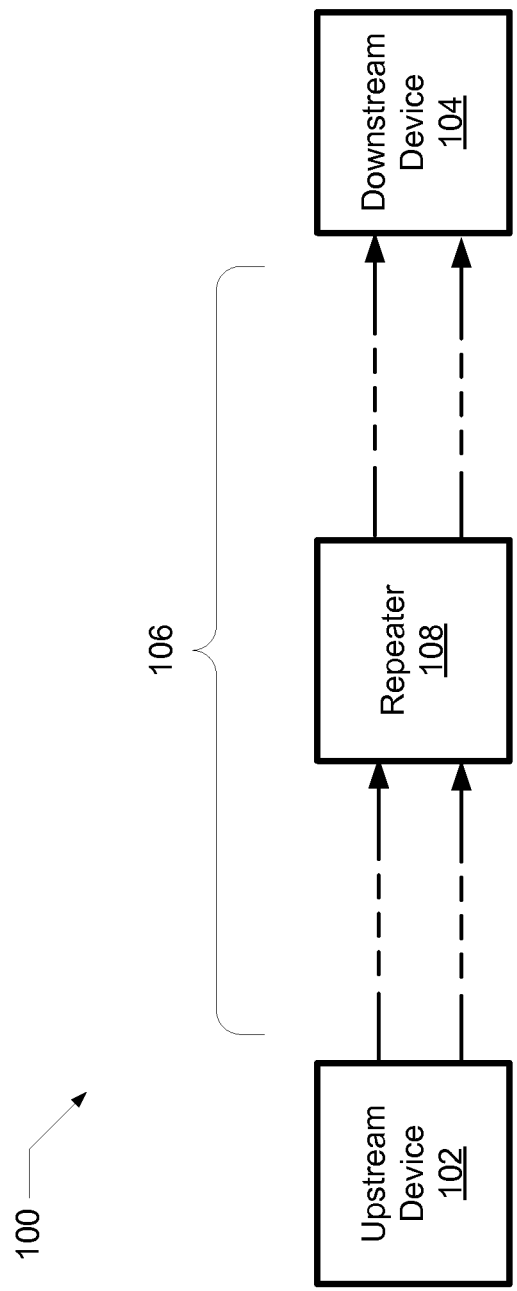
FIG. 1 is a simplified block diagram of a serial data transmission system.

FIG. 1 is a block diagram depicting an example of an implementation of a serial bus communication system 100. Serial bus communication system 100 includes a transmitter or upstream device 102, a receiver or downstream device 104, and a serial bus 106. Serial bus 106 includes one or more intermediary signal conditioning devices (singly and collectively "repeater 108") coupled in series. It should be appreciated that a single repeater 108 may be used in serial bus 106 depending on trace or cable length of the serial bus. For purposes of clarity and not limitation, it shall be assumed that traces are used. Thus, a repeater 108 may be used as a serial link driver interface for serial bus 106, or multiple repeaters 108 may be used to provide a serial link driver interface for serial bus 106. Additionally, it should be appreciated that serial bus 106 includes traces formed of a transmission medium such as conductive material or other means for propagating electric signals. It should also be appreciated that for implementations in which multiple repeaters 108 are used, one or more of the multiple repeaters may be a hybrid repeater as described herein.

Transmitter 102 may be implemented in a larger block such as any of a variety of integrated circuits or devices including, but not limited to, input/output ("I/O") hubs, root complexes, servers, and laptop docking stations, among others. Furthermore, it should be appreciated that receiver 104 may be embedded in a larger block such as any of a variety of peripheral devices including, but not limited to, hard disk drives, graphics cards, and daughter cards, among others.

Transmitter 102 may include a differential output driver (not shown) for providing a differential signal to repeater 108. Repeater 108 processes an output transmission from transmitter 102 to provide such processed output transmission to another repeater or directly to receiver 104. Receiver 104 includes a differential input driver (not shown).

There are many known differential digital signaling protocols that may be used with serial bus communication system 100 such as, for example, differential Stub-Series Terminated Logic ("SSTL"), differential High-Speed Transceiver Logic ("HSTL"), Low-Voltage Differential Signaling ("LVDS"), differential Low-Voltage Positive Emitter Coupled Logic ("LVPECL"), and Reduced Swing Differential Signaling ("RSDS") among other differential digital signaling protocols. Additionally, implementations are contemplated that use single-ended serial interface protocols such as, for example, Low Voltage Transistor-Transistor Logic ("LVTTL") such as used for PCI, and Low Voltage Complementary Metal Oxide Semiconductor ("LVCMOS"), among other single-ended serial interface protocols. Conventionally PCI uses an LVTTL input buffer and a push-pull output buffer. Communication via serial bus 106 may use a differential or single-ended signaling protocol. However, for purposes of clarity and not limitation, it shall be assumed that differential signaling is used.

Figure 2:
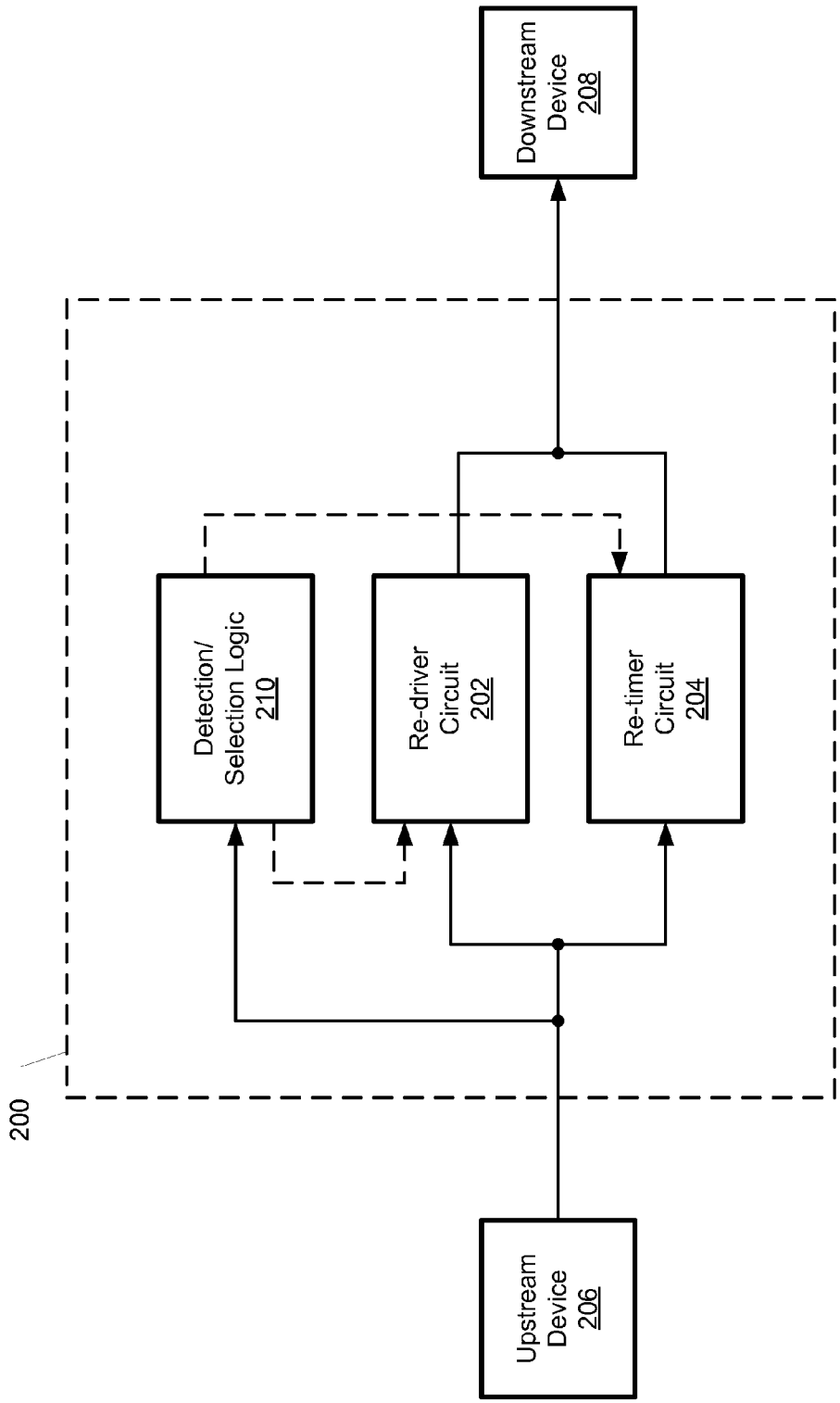
FIG. 2 is a simplified block diagram of a repeater designed in accordance with a specific implementation.

FIG. 2 is a simplified block diagram of a repeater 200 designed for compatibility with different versions of the same serial protocol (e.g., DisplayPort, HDMI, Serial ATA, PCI-E, or USB). Repeater 200 includes a re-driver circuit 202 and a re-timer circuit 204 in parallel. Re-driver circuit 202 is configured for transmission of data at a lower data rate according to an earlier version of the serial data protocol than re-timer circuit 204. Re-timer circuit 204 is configured for transmission of data at a higher data rate according to a later version of the serial data protocol, and therefore may include complex data and clock recovery functions that are characterized by higher power consumption than re-driver circuit 202.

Detection/selection logic 210 detects which version of the serial protocol is to be used for transmission of data between devices 206 and 208 and selects either re-driver circuit 202 or re-timer circuit 204 accordingly. This selection may involve enabling operation of the selected signal path and/or disabling operation of the non-selected signal path. According to a particular implementation, this hybrid solution recognizes the data rate from the handshaking between the transmitter and the receiver during link training and selects the corresponding signal path. However, it should be noted that other information might be used to make the selection. For example, the data rate of the incoming data itself might be detected. More generally, any information that may be used to identify the data rate and/or the version of the protocol with which the upstream and downstream device are communicating may be used for this purpose. It should also be noted that FIG. 2 only shows the downstream transmission path from device 206 to device 208. However, it will be understood that an upstream transmission path may include substantially identical circuitry for transmission of serial data from device 208 to device 206. It should also be noted that the incoming data may be differential or single-ended data.

Figure 3:
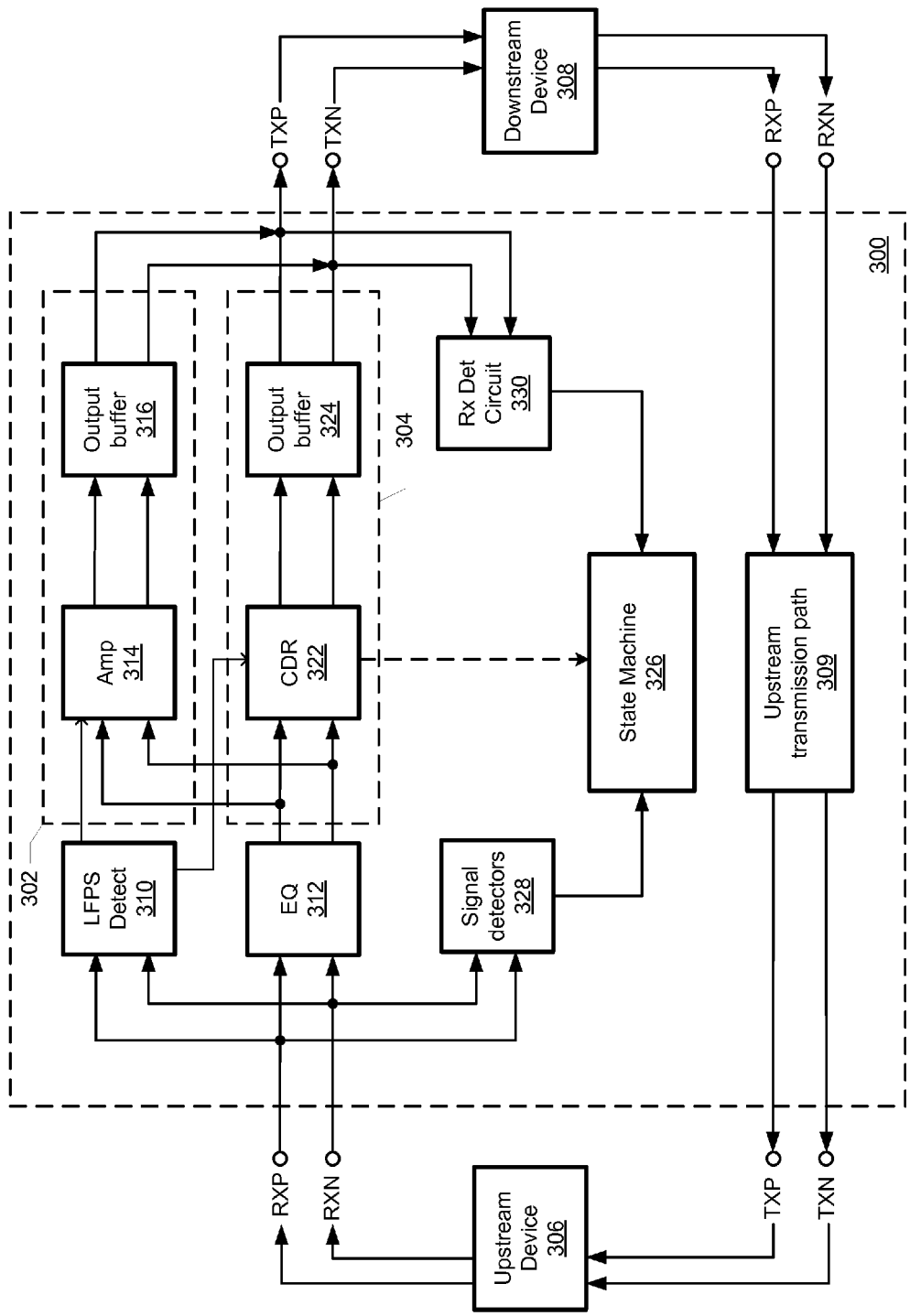
FIG. 3 is a simplified block diagram of a repeater designed in accordance with a more specific implementation.

FIG. 3 is a simplified block diagram of a repeater 300 designed for compatibility with versions 3.0 and 3.1 of the Universal Serial Bus (USB) standard. Version 3.0 is described in the *Universal Serial Bus 3.0 Specification*, Revision 1.0, Jun. 6, 2011 (USB 3.0 or gen 1); version 3.1 is described in the *Universal Serial Bus 3.1 Specification*, Revision 1.0, Jul. 26, 2013 (USB 3.1 or gen 2); both of which are incorporated herein by reference in their entireties for all purposes. It should again be noted that the principles described with reference to the example depicted in FIG. 3 are generally applicable to high-speed serial interfaces including, for example, repeaters implemented according to the DisplayPort standard, the HDMI standard, the Serial ATA standard, and the PCI-E standard. The scope of the present disclosure should therefore not be limited by reference to the examples described herein.

As the market migrates from USB 3.0 to USB 3.1, devices conforming to USB 3.1 will need repeaters that include a re-timer circuit as part of the clock and data recovery function. That is, USB 3.0 employs an analog approach in which inter-symbol interference (ISI) jitter is corrected with analog filtering after which the signal level is boosted for transmission downstream. There is sufficient margin between data pulses that little, if anything, needs to be done regarding the timing of the incoming data.

By contrast, USB 3.1 employs a time-domain technique to resynchronize the data with the clock, and clean up the ISI jitter (as well as other forms of associated jitter). The synchronization aligns the clock (also referred to as the data strobe) with each data "eye," i.e., the envelope defined by the differential data for each symbol in the serial data. This alignment is necessary due to the fact that doubling the speed relative to USB 3.0 means that the margin between symbols for USB 3.1 is effectively cut in half. In addition, USB is characterized by more ISI jitter at the higher data rate for a given cable length.

Repeater 300 includes a re-driver circuit 302 and a re-timer circuit 304 in parallel to achieve compatibility with both USB 3.0 and USB 3.1. When the link between upstream device 306 (e.g., a USB host) and downstream device 308 (e.g., a USB slave) is determined to be a USB 3.0 link, re-driver circuit 302 is selected to transmit the serial data. When the link is determined to be a USB 3.1 link, re-timer circuit 304 is selected. According to a particular implementation, this hybrid solution recognizes the data rate from the handshaking between the transmitter and the receiver during link training and selects the corresponding signal path. As mentioned above with reference to the implementation depicted in FIG. 2, any information that may be used to identify the data rate and/or the version of the protocol with which the upstream and downstream device are communicating may be used for this purpose. It should be noted that FIG. 3 only shows the details of the downstream transmission path from device 306 to device 308. However, it will be understood that upstream transmission path 309 may include substantially identical circuitry for transmission of serial data from device 308 to device 306. It should also be noted that, while the discussion of the example of FIG. 3 assumes the incoming data to be differential data, single-ended implementations are contemplated.

As will be appreciated, the repeater shown in FIG. 3 supports backward compatibility with legacy USB 3.0 devices. Further, some implementations may be characterized by one or more advantages. For example, one approach to providing backward compatibility involves using the same re-timer circuitry to establish both USB 3.0 and USB 3.1 links. However, this approach may be characterized by some drawbacks. For example, circuitry designed to operate in accordance with USB 3.1 typically consumes more power than conventional repeaters designed to operate in accordance with USB 3.0 because of the need to perform the more complex data and clock recovery functions. Use of the same circuitry for transmitting USB 3.0 data therefore results in higher power consumption to perform signal processing this is not necessary for the lower data rate.

In addition, link training for USB 3.1 links requires time to lock the clock to the data and to achieve the specified $10^{-12}$ bit error rate. This link training typically requires on the order of a millisecond or more to complete. By contrast, the link training sequence for USB 3.0 links is a very low latency operation, i.e., orders of magnitude faster than the USB 3.1 training sequence. Because of this difference, solutions that employ the same circuitry for both generations of serial data may have problems establishing links to legacy devices. That is, if a repeater waits to transmit data downstream until it completes the USB 3.1 training sequence, the connection to a legacy receiver downstream may fail because the receiver times out before the repeater completes the training sequence.

One way to deal with this is for the repeater to begin transmitting data to the legacy receiver before its training sequence is complete. However, these data will, at least initially, have an error rate many orders of magnitude greater than the specified error rate, e.g., $10^{-4}$ vs. $10^{-12}$ bit error rate. By contrast, the hybrid solutions exemplified by repeater 300 of FIG. 3 solve the legacy compatibility issue while (at least in some cases) reducing power consumption and avoiding failed connections to legacy receivers.

Such solutions may also be cheaper and easier to implement. That is, parallel signal paths for transmitting different generations of serial data allow for the use of relatively simpler circuits for the transmission of legacy data, e.g., solutions that have been proven and accepted in the marketplace. Parallel signal paths also allow for the optimization of each signal path for a particular data rate rather than attempting to solve the difficult engineering problem of making the same circuitry satisfy all of the requirements for different generations of the same standard; an approach which often results in sub-optimal performance for each data rate.

Referring again to FIG. 3, repeater 300 includes a low-frequency periodic signal (LFPS) detector 310 that detects the protocol version and/or data rate with which device 306 and device 308 will be communicating. In the USB domain, the LFPS is a sideband handshake between the transmitter and the receiver that negotiates the data rate. There is a difference between the LFPS for USB 3.0 and the LFPS for USB 3.1 which LFPS detector 310 detects and then uses to select either re-driver circuit 302 or re-timer circuit 304 to transmit the serial data (e.g., via the control lines to amplifier 314 and CDR 322). According to a particular class of implementations, LFPS detector is configured to detect whether either or both of devices 306 and 308 is a USB 3.1 device with reference to the SuperSpeedPlus capability declaration (SCD) made by such devices during the LFPS handshake. The bit pattern of the SCD is described in the USB 3.1 specification incorporated herein by reference above. When this pattern is detected, at least one of the devices is a USB 3.1 device. If both devices 306 and 308 are implemented in accordance with USB 3.1, then re-timer circuit 304 is selected; if one or both are implemented in accordance with USB 3.0, re-driver circuitry 302 is selected (with any USB 3.1 device automatically converting to the 3.0 data rate). According to some implementations, LFPS detector 310 is also configured to disable the non-selected circuit (e.g., via the control lines to limiter 314 and CDR 322).

According to some implementations (e.g., as shown in FIG. 3), the LFPS detector may be integrated with the re-driver circuit as shown. This may be advantageous in that it would allow for re-use of previous re-driver circuit designs that include such a detector. As mentioned above, the re-use of previous designs takes advantage of the fact that, from an implementation standpoint, it is simple and cheap, proven in the marketplace, and lower power consumption, while solving the legacy compatibility issue. Alternatively, the LFPS detector may be implemented in a signal path that is separate from both the re-driver circuit and the re-timer circuit.

An equalizer 312 is used by both re-driver circuit 302 and re-timer circuit 304 and provides analog filtering for the incoming data to correct for at least some ISI jitter. According to such an implementation, Equalizer 312 has programmable filter settings that are different for USB 3.0 and USB 3.1 data. According to some implementations, these filter settings may be initially set for the filtering of USB 3.0 data. This may be acceptable in that re-timer circuit 304 includes additional timing blocks (discussed below) that further improve the quality of the signal, i.e., re-timer circuit 304 can compensate for jitter even where equalizer 312 is not initially configured for the higher data rate. Alternatively, implementations are contemplated in which separate analog filtering is provided for re-driver circuit 302 and re-timer circuit 304.

Because filtering by equalizer 312 attenuates the incoming data, an amplifier 314 is provided in re-driver circuit 302 to amplify the data signal to achieve a high signal-to-noise ratio (SNR). Output buffer 316 then drives the data onto the output of repeater 300 (e.g., differential signals TXP and TXN).

Clock and data recovery (CDR) circuit 322 operates to align the clock/data strobe with each data eye to achieve a high SNR. Output buffer 324 adjusts data signal levels and drive the data onto the output of repeater 300.

According to a particular class of implementations, repeater 300 implements a state machine 326 that uses time-domain characteristics of the physical data signals (e.g., from signal detectors 328 and receiver detector circuit 330) to determine when, for example, to enter a power-saving mode, e.g., based on whether there is a connection to a receiver, the idle time between data being transmitted, etc. In the depicted implementation, state machine 326 is implemented in accordance with the USB 3.1 specification incorporated herein by reference above. However, implementations are contemplated in which a more sophisticated approach is taken.

Such implementations take advantage of the fact that the data in the re-timer circuit is recovered and aligned with the clock. That is, the content of the data, e.g., specific commands being sent between the transmitter and the receiver, may be detected and used for any of a variety of purposes. For example, such information might be useful for entering power-saving states. Instead of making "guesses" (e.g., based on idle times) about when to enter a low-power state, the repeater can enter a low-power state based on actual commands sent between the transmitter and the receiver that indicate a low-power state is being entered by one or both devices. More generally, when transmitting USB 3.1 data, the repeater (based on the configuration of the state machine) can be configured to operate in a manner that is responsive to the content of the data rather than just the timing of the physical data signals. This is represented by the dashed line in FIG. 3 between CDR 322 and state machine 326. In another example, the content of the data may be used for the purpose of determining the state of link training between two devices and adapting operation of the repeater accordingly. The diversity of other examples will be appreciated by those of skill in the art.

Various implementations described herein may be implemented using any of a variety of standard or proprietary CMOS processes. In addition, it should be noted that implementations are contemplated that may employ a much wider range of semiconductor materials and manufacturing processes including, for example, GaAs, SiGe, etc. Repeaters as described herein may be represented (without limitation) in software (object code or machine code in non-transitory computer-readable media), in varying stages of compilation, as one or more netlists (e.g., a SPICE netlist), in a simulation language, in a hardware description language (e.g., Verilog, VHDL), by a set of semiconductor processing masks, and as partially or completely realized semiconductor devices (e.g., an ASIC). Some implementations may be a standalone integrated circuit, while others may be embedded as part of larger system on a chip.

It will be understood by those skilled in the art that changes in the form and details of the implementations described above may be made without departing from the scope of this disclosure. In addition, although various advantages have been described with reference to some implementations, the scope of this disclosure should not be limited by reference to such advantages. Rather, the scope of this disclosure should be determined with reference to the appended claims.

What is claimed is:

1. A repeater circuit, comprising:
   first circuitry configured to operate in accordance with a first version of a serial data protocol, the first version of the serial data protocol being characterized by a first data rate;
   second circuitry configured to operate in accordance with a second version of the serial data protocol, the second version of the serial data protocol being characterized by a second data rate that is higher than the first data rate;
   detection circuitry configured to determine, with reference to sideband communication between a transmitting device and a receiving device, whether incoming data from the transmitting device should be transmitted to the receiving device according to the first version of the serial data protocol or the second version of the serial data protocol; and
   selection circuitry configured to select, responsive to the detection circuitry, the first circuitry or the second circuitry for transmission of the incoming data from the transmitting device to the receiving device.

2. The repeater circuit of claim 1, wherein the serial data protocol corresponds to one of the DisplayPort standard, the High-Definition Multimedia Interface (HDMI) standard, the Serial ATA standard, the Peripheral Component Interconnect Express (PCI-E) standard, or the Universal Serial Bus (USB) standard.

3. The repeater circuit of claim 2, wherein the serial data protocol corresponds to the USB standard, and wherein the first version of the serial data protocol is USB version 3.0 and the second version of the serial data protocol is USB version 3.1.

4. The repeater circuit of claim 1, wherein the first circuitry is characterized by lower power consumption during data transmission than the second circuitry.

5. The repeater circuit of claim 1, wherein the second circuitry includes data and clock recovery circuitry configured to align data pulses of the incoming data with data strobes.

6. The repeater circuit of claim 5, further comprising a state machine configured to control one or more aspects of the operation of the repeater in response to command content of the data pulses.

7. The repeater circuit of claim 6, wherein the one or more aspects of the operation of the repeater include entering and exiting one or more power saving states.

8. The repeater circuit of claim 1, further comprising a state machine configured to control one or more aspects of the operation of the repeater in response to time-domain characteristics of physical signals corresponding to the incoming data.

9. The repeater circuit of claim 1, wherein the detection circuitry is integrated with the first circuitry.

10. The repeater circuit of claim 1, wherein the incoming data is differential data or single-ended data.

11. The repeater circuit of claim 1, wherein the detection circuitry is integrated with the re-driver circuitry.

12. The repeater circuit of claim 1, wherein the incoming data is differential data or single-ended data.

13. The repeater circuit of claim 1, wherein the first version of the USB protocol is version 3.0 and the second version of the USB protocol is version 3.1.

14. A repeater circuit, comprising:
    re-driver circuitry configured to operate in accordance with a first version of the Universal Serial Bus (USB) protocol;
    re-timer circuitry configured to operate in accordance with a second version of the USB protocol;
    detection circuitry configured to determine, with reference to a link training sequence between a transmitting device and a receiving device, whether incoming data from the transmitting device should be transmitted to the receiving device according to the first version of the USB protocol or the second version of the USB protocol; and
    selection circuitry configured to select, responsive to the detection circuitry, the re-driver circuitry or the re-timer circuitry for transmission of the incoming data from the transmitting device to the receiving device.

15. The repeater circuit of claim 14, wherein the re-driver circuitry is characterized by lower power consumption during data transmission than the re-timer circuitry.

16. The repeater circuit of claim 14, wherein the re-timer circuitry includes data and clock recovery circuitry configured to align data pulses of the incoming data with data strobes.

17. The repeater circuit of claim 16, further comprising a state machine configured to control one or more aspects of the operation of the repeater in response to command content of the data pulses.

18. The repeater circuit of claim 17, wherein the one or more aspects of the operation of the repeater include entering and exiting one or more power saving states.

19. The repeater circuit of claim 14, further comprising a state machine configured to control one or more aspects of the operation of the repeater in response to time-domain characteristics of physical signals corresponding to the incoming data.

20. A method for transmitting data with a repeater circuit, the repeater circuit including first circuitry configured to operate in accordance with a first version of a serial data protocol, the first version of the serial data protocol being characterized by a first data rate, the repeater circuit further including second circuitry configured to operate in accordance with a second version of the serial data protocol, the second version of the serial data protocol being characterized by a second data rate that is higher than the first data rate, the method comprising:
    determining, with reference to sideband communication between a transmitting device and a receiving device, whether incoming data from the transmitting device should be transmitted to the receiving device according to the first version of the serial data protocol or the second version of the serial data protocol; and
    selecting, responsive to the determination, the first circuitry or the second circuitry for transmission of the incoming data from the transmitting device to the receiving device.

* * * * *